Oct. 5, 1943.   C. G. PULLIN   2,330,842
ROTATING WING AIRCRAFT
Filed May 27, 1940   13 Sheets-Sheet 11
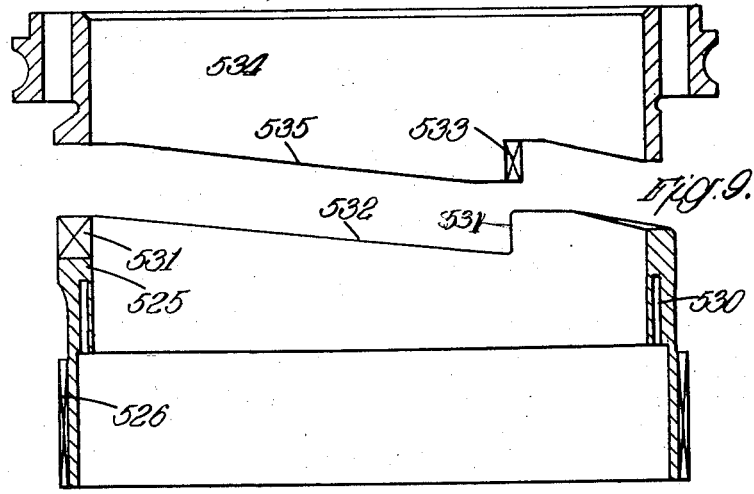
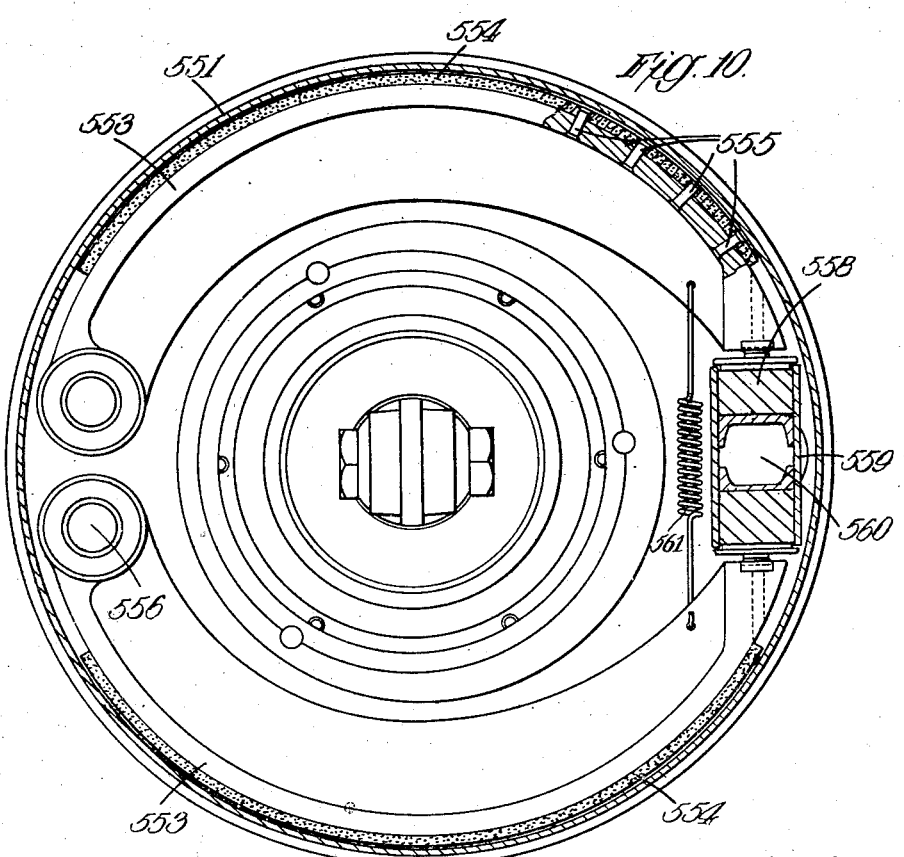
INVENTOR
Cyril George Pullin
ATTORNEYS

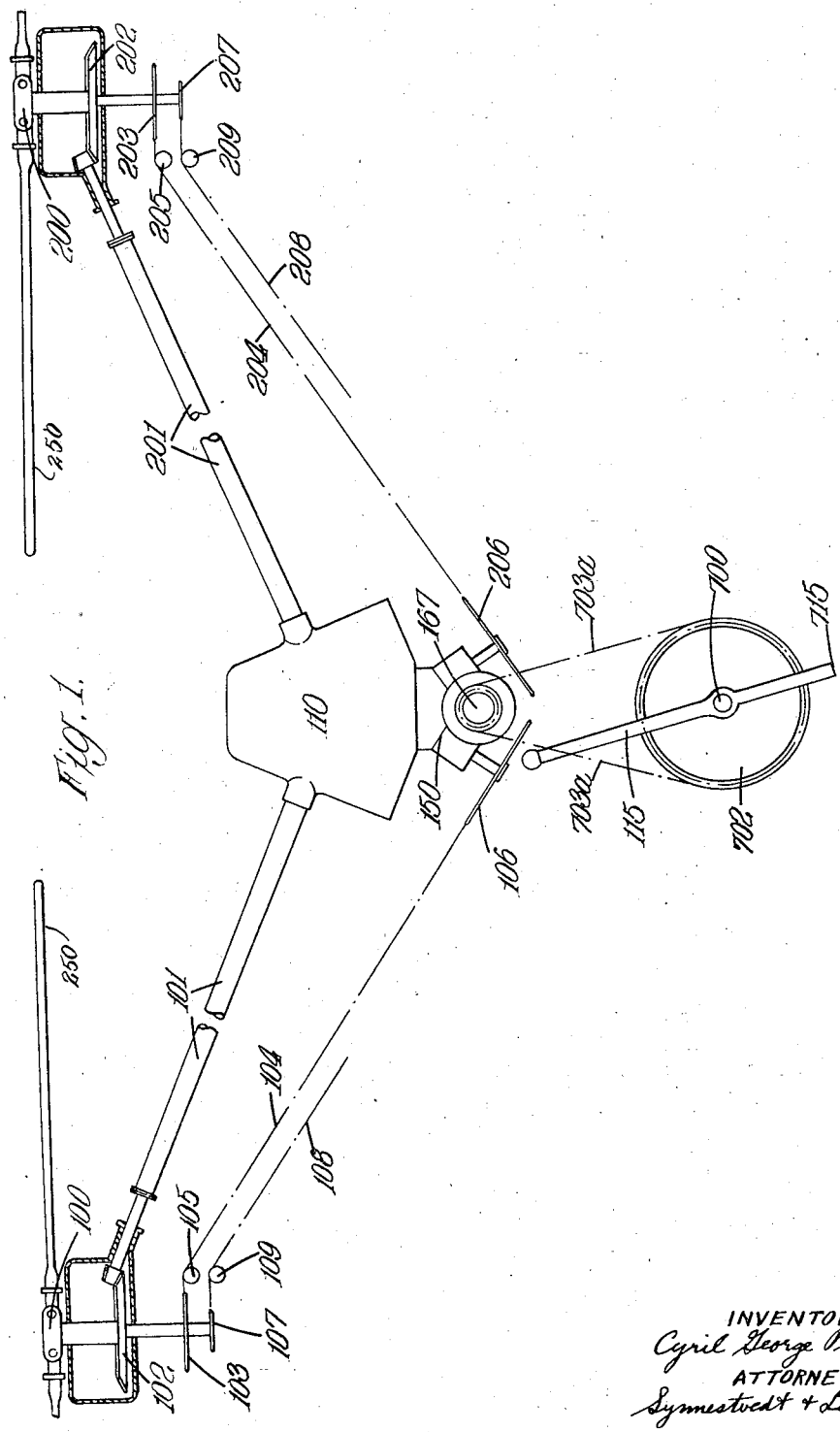

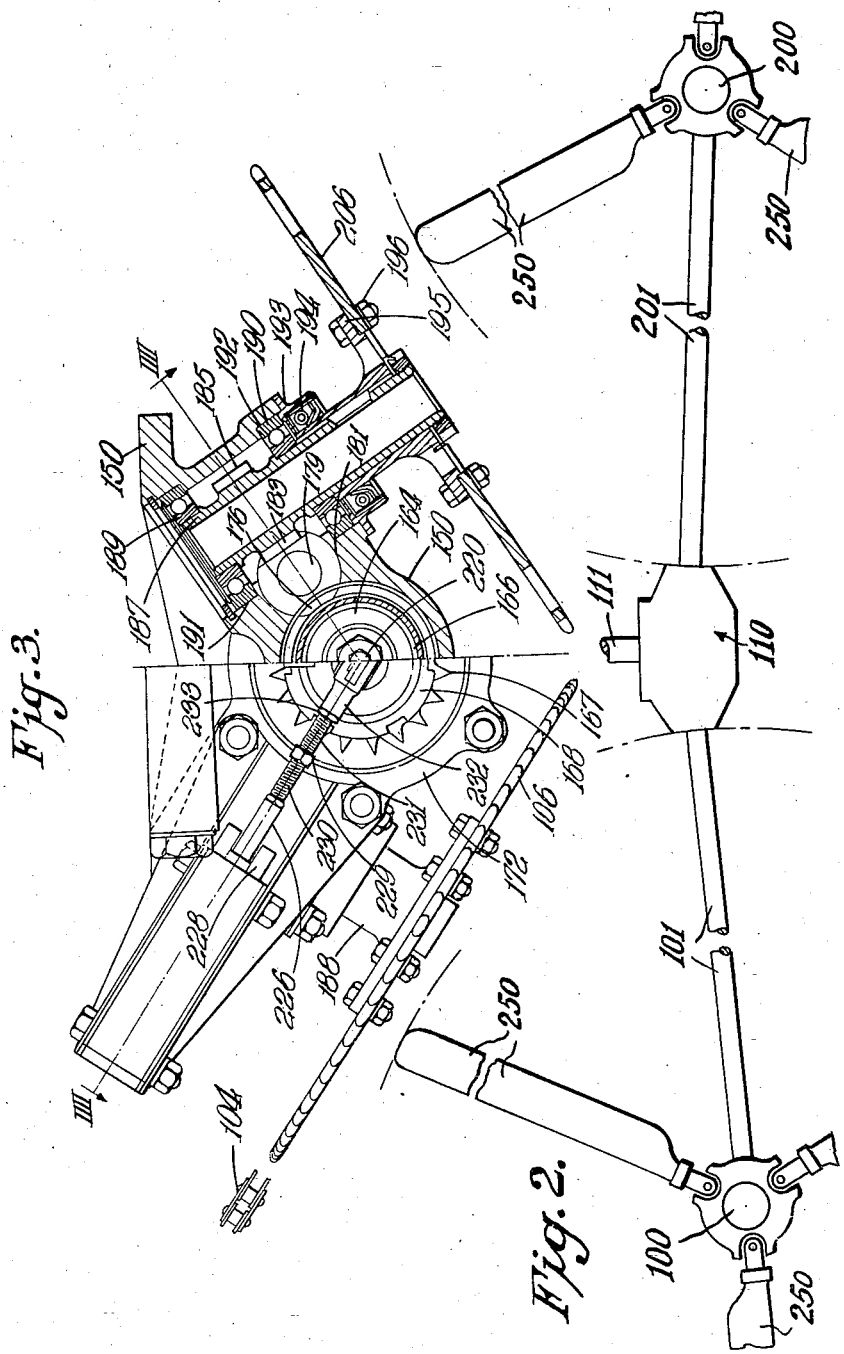

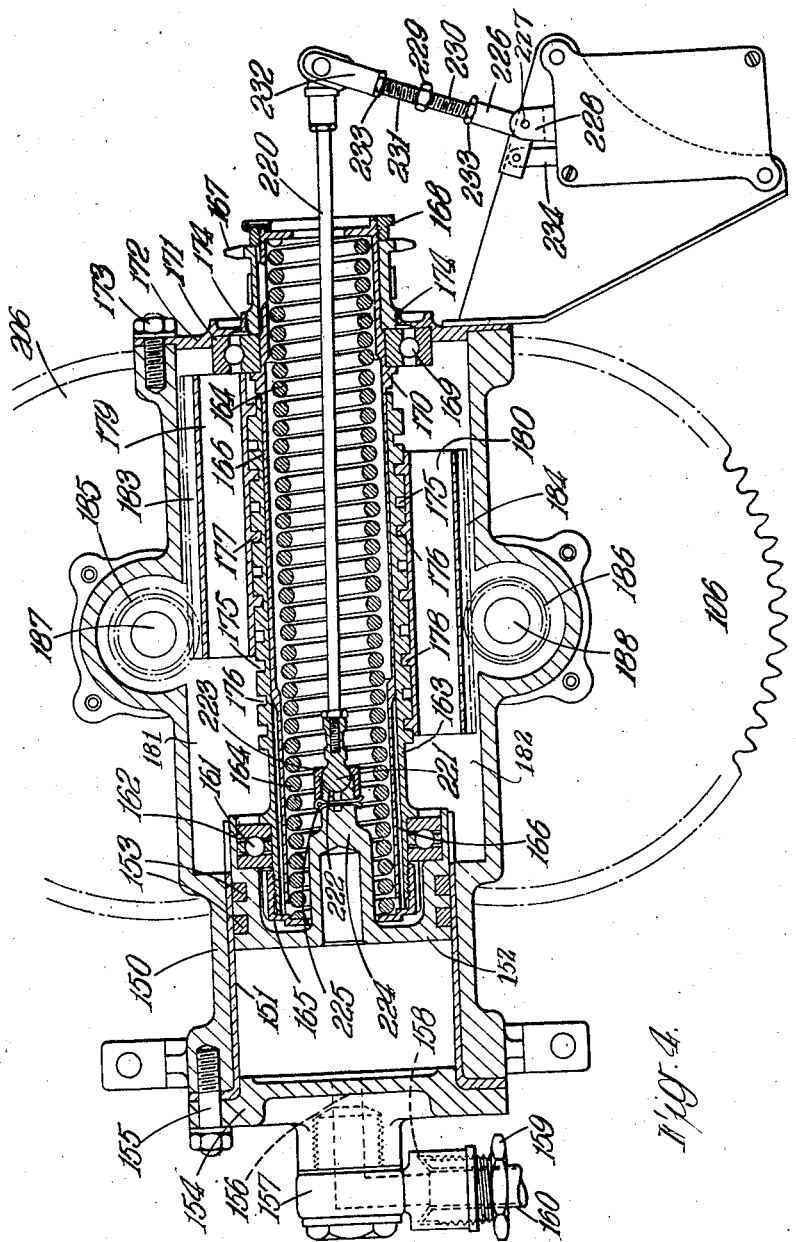

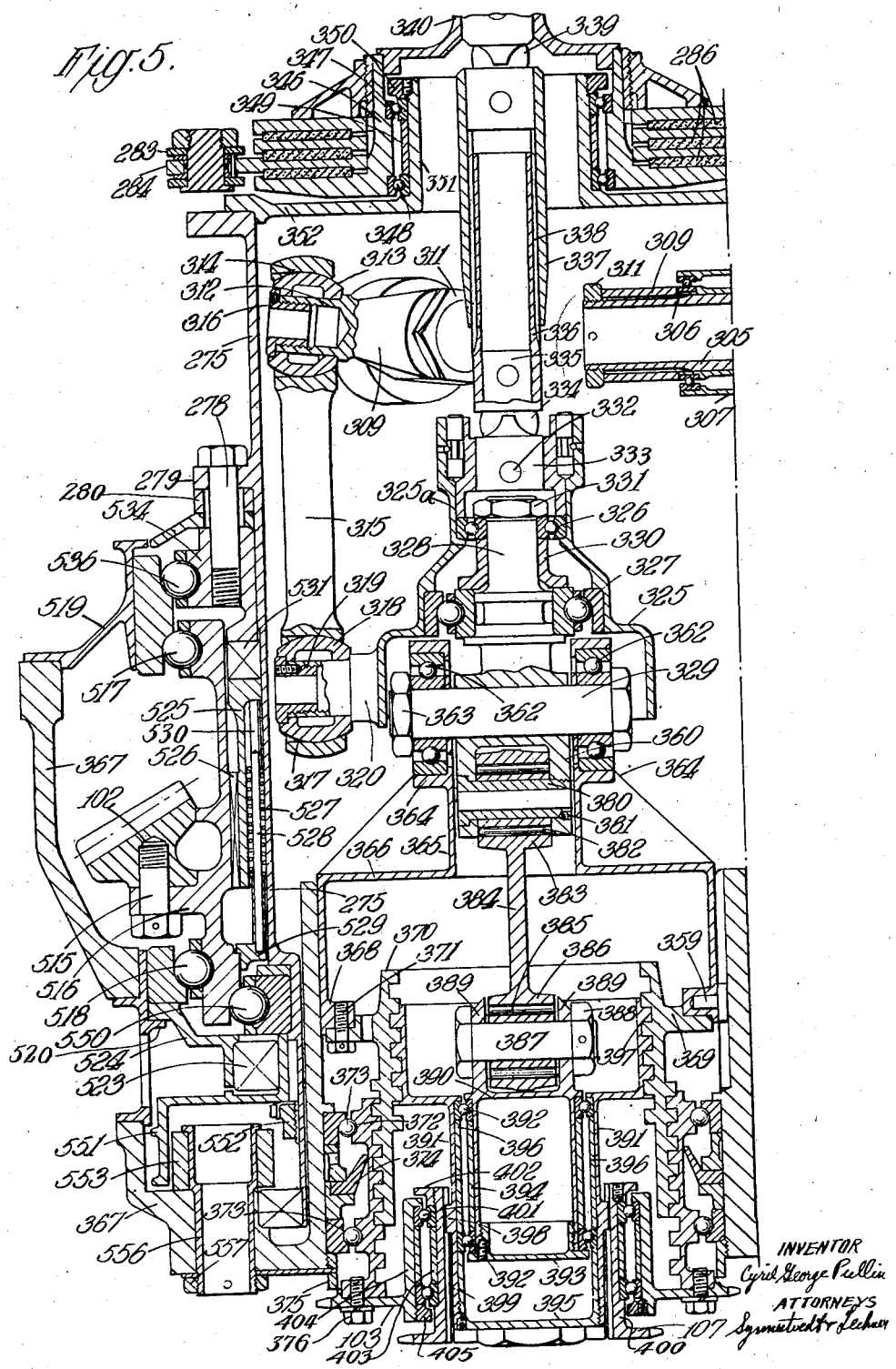

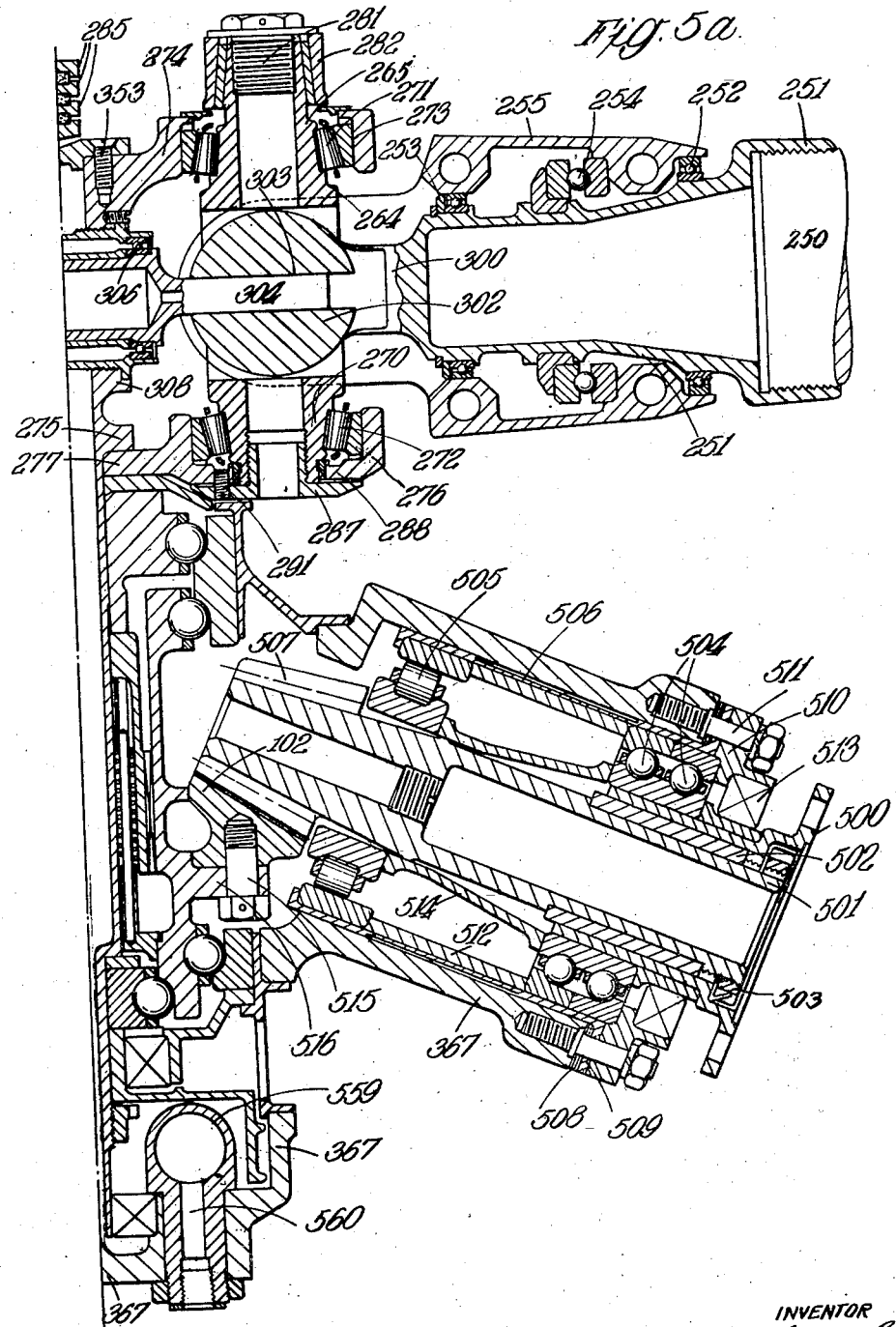

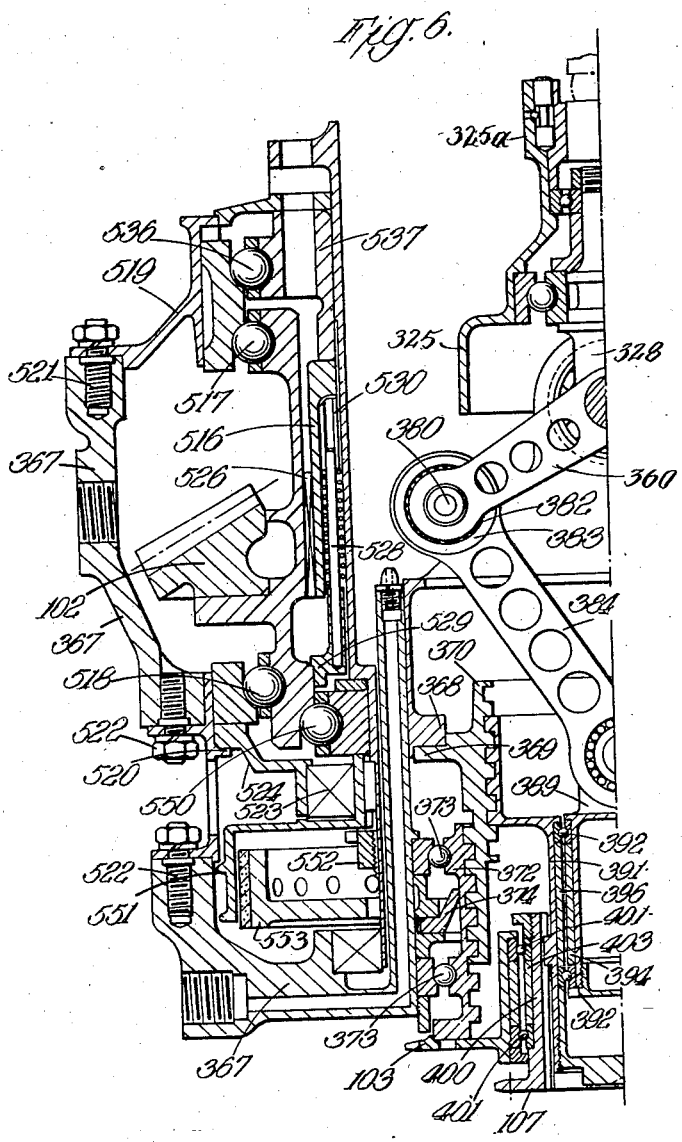

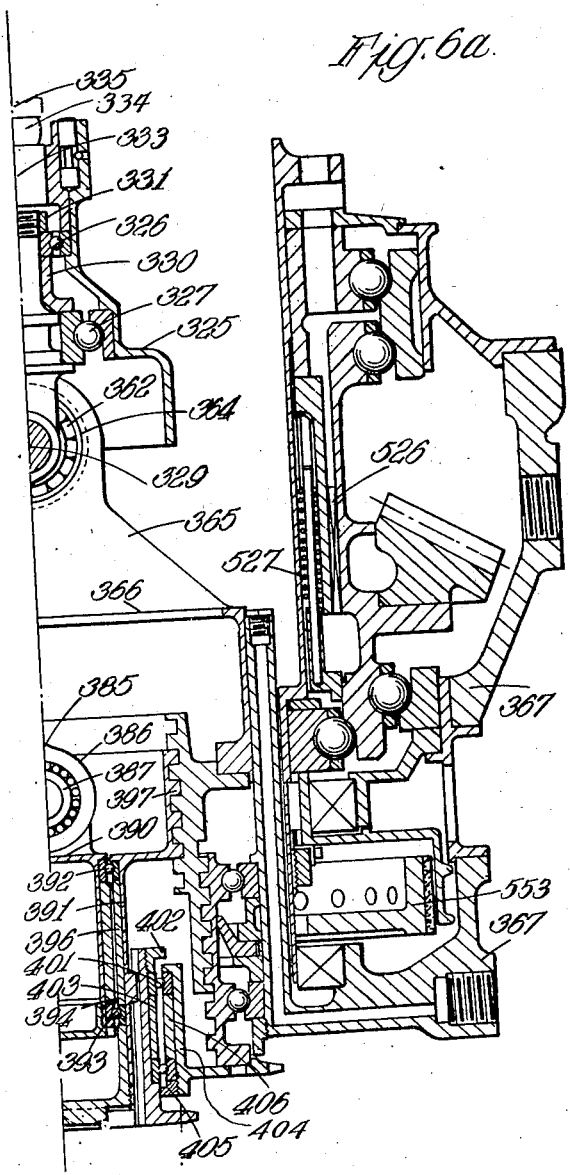

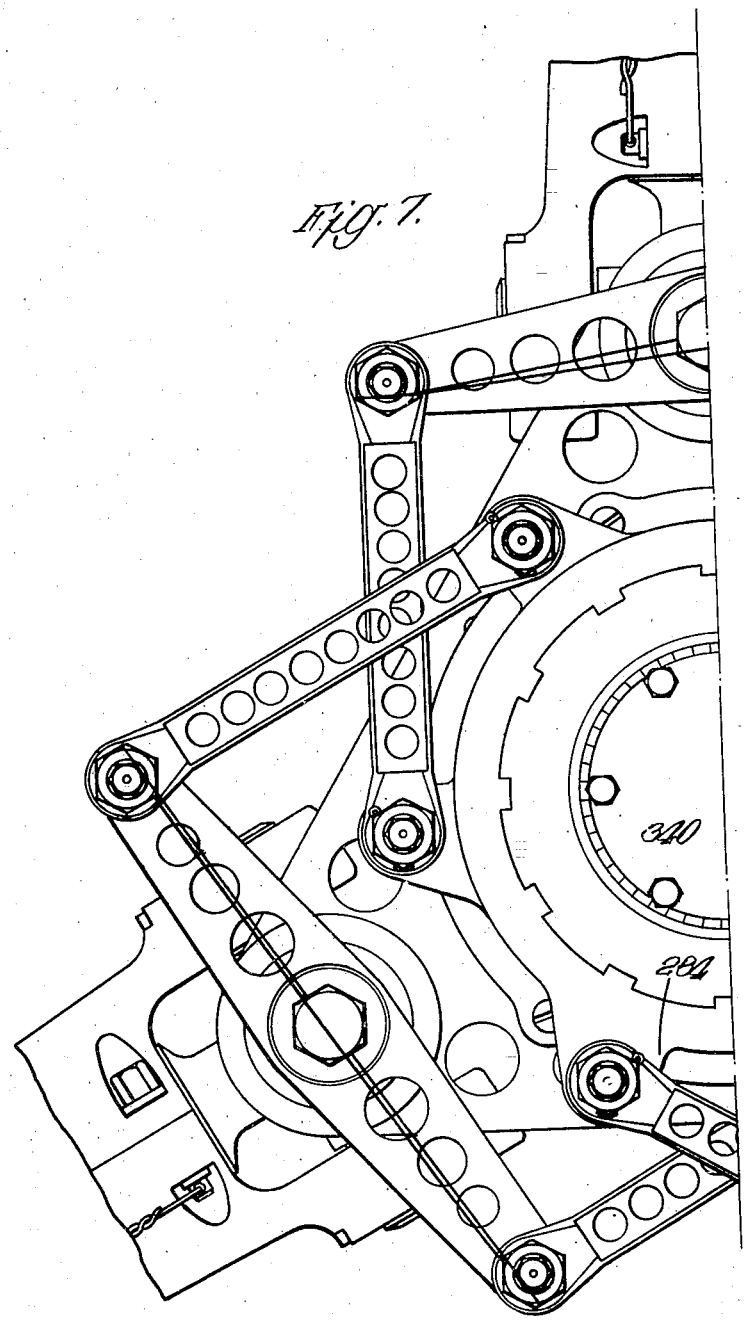

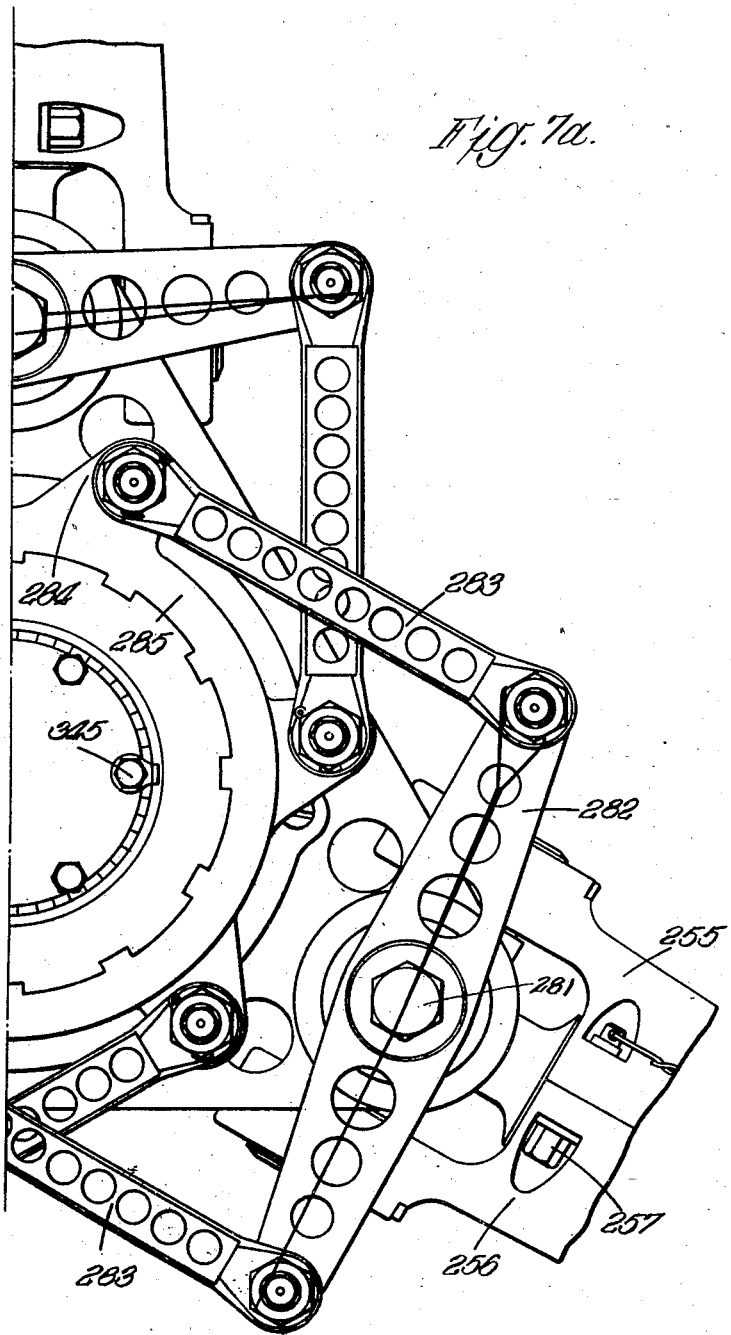

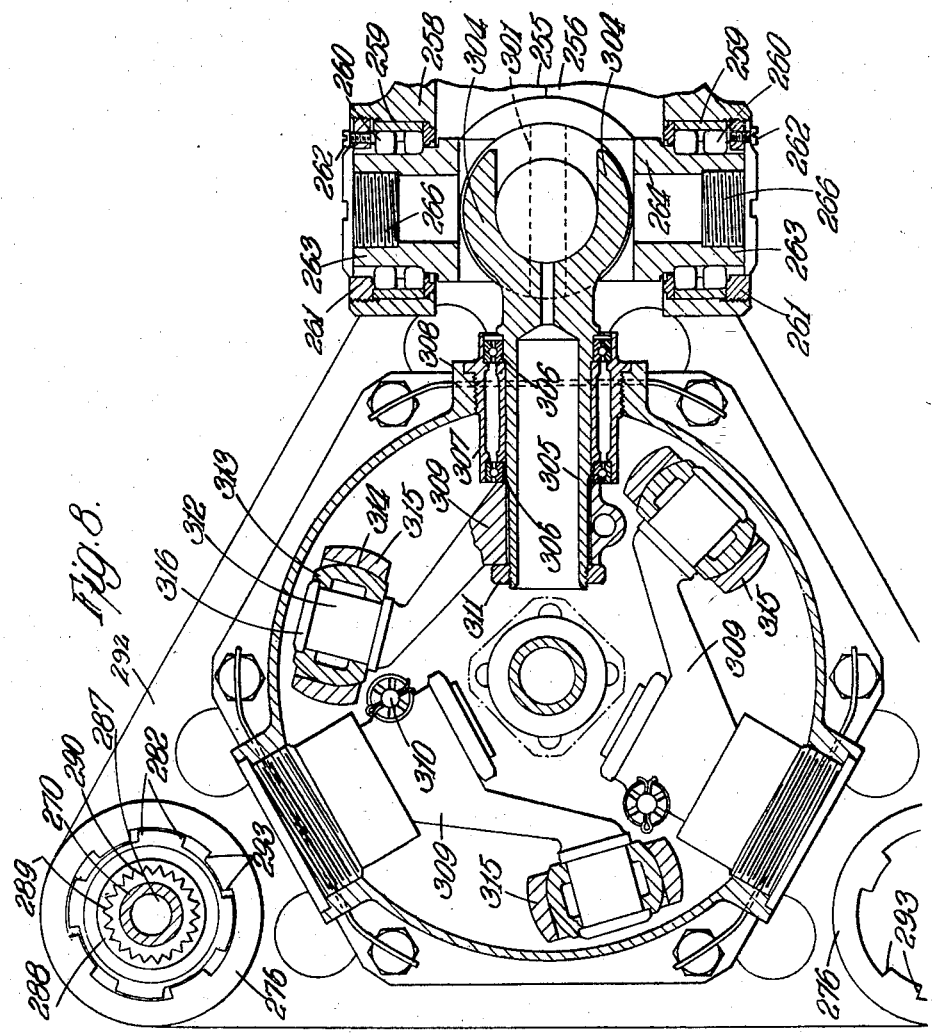

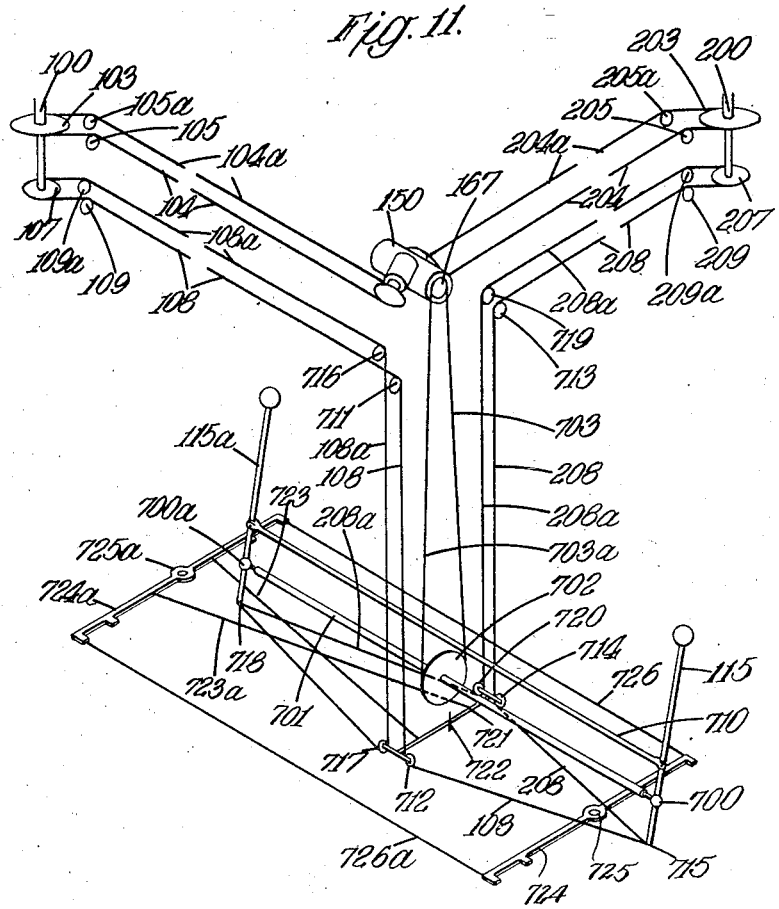

Oct. 5, 1943.  C. G. PULLIN  2,330,842
ROTATING WING AIRCRAFT
Filed May 27, 1940   13 Sheets-Sheet 13
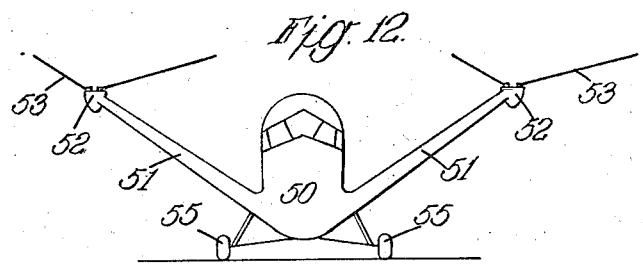
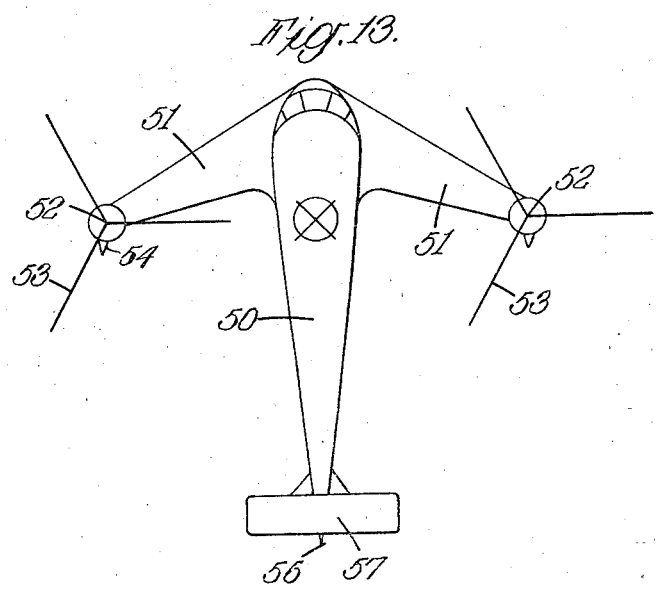
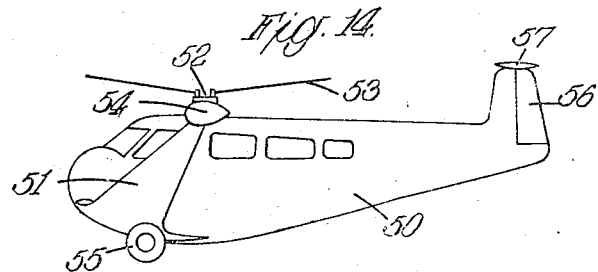
INVENTOR
Cyril George Pullin
ATTORNEYS Patented Oct. 5, 1943

2,330,842

UNITED STATES PATENT OFFICE 2,330,842

ROTATING WING AIRCRAFT

Cyril George Pullin, Genista, Newton Mearns, Scotland, assignor to Autogiro Company of America, Willow Grove, Pa., a corporation of Delaware Application May 27, 1940, Serial No. 337,381
In Great Britain March 9, 1939

18 Claims. (Cl. 244—17)

The present invention relates to rotative wing aircraft and more particularly to sustaining rotors and control means therefor.

In the operation of rotating wing aircraft employing one or more rotors in any configuration and having any number of blades, it has been found that the differential velocity of the air flow to which a rotor is subjected, occasioned by forward or relative speed of the rotor, produces an overturning moment. To overcome this defect, it has been proposed to articulate the rotor blades in suchwise that the overturning moment results in what is called "flapping" as distinguished from coning of the blades, such coning being the inclining of the blades produced by their lift in relation to the centrifugal force developed by the blades by their rotation about the real axis of the rotor. This flapping results in rotation of the rotor blades about a virtual axis which produces a dynamic un-balance in relation to the real or mechanical axis. It has also been proposed to provide the articulation with hinges so angled that vertical movement of the blades as in "flapping" will twist or turn the blades so as to reduce the geometric pitch and reduce the "flapping" and the effect thereof. Further, with solid rotors, or those without articulation, it has been proposed to introduce a cyclic variation of pitch in suchwise as to reduce the geometric incidence with a view to maintaining the lift constant throughout the disc area. All such systems are only partially effective and do not take into account the shift of the centre of pressure along the blades under the influence of the differential velocity of the fluid flow over the blades.

An object of this invention is to provide a hub for a sustaining rotor and a control system therefor, the former carrying the rotor blades in suchwise that, in conjunction with the control system, all out of balance and variable lift forces as above described will be eliminated, thereby promoting smoothness of operation and high efficiency under all conditions of flight.

A feature of this invention consists in arranging the axes of the flapping and drag articulations so that they intersect at a point offset from the rotational axis of the rotor hub, the articulations forming in effect an universal joint. This arrangement simplifies the hub construction as movements about one of the articulations can be separated from those about the other.

A further feature consists in coupling the rotor blades at their root ends to arms connected by links to a member common to all the blades and which is moved vertically to cause pitch angle change of the blades. Moreover cyclic pitch change can be produced by tilting this common member so that as the hub rotates the pitch angles of the blades are altered according to their rotational position, thereby reducing flapping movements of the blades.

Although the combination is applicable to most kinds of rotative wing aircraft it is proposed to describe the invention as applied to a helicopter having a rotor mounted on each side of the fuselage, as illustrated in the accompanying drawings. It is, however, to be understood that the construction of the rotor hub and the arrangement of the control system are applicable with slight modifications within the competence of those skilled in this art to aircraft having any desired number of rotors, for instance a single rotor disposed above the fuselage.

One constructional embodiment of a rotor hub and control means in accordance with this invention are illustrated by way of example in the accompanying drawings, in which:

Fig. 1 is a diagrammatical view in a fore and aft direction of a helicopter having a pair of side-by-side sustaining rotors;

Fig. 2 is a plan view corresponding to Fig. 1;

Fig. 3 is an elevational view partly in section of the rotor pitch change control;

Fig. 4 is a sectional view on the line IIII—IIII of Fig. 3;

Fig. 5 is a vertical lateral cross section through the hub of one of the rotors;

Figure 5a is a continuation of Figure 5 on the right-hand side;

Fig. 6 is a lateral sectional view at right angles to Fig. 5 showing the lower part of the hub;

Figure 6a is a continuation of Figure 6 on the right-hand side;

Fig. 7 is a plan view of the rotor hub;

Figure 7a is a continuation of Figure 7 on the right-hand side;

Fig. 8 is a fragmentary horizontal sectional view through the rotor generally in the plane of the blades;

Fig. 9 is a sectional view showing details of the rotor drive clutch;

Fig. 10 is a view partly in section showing details of the rotor brake;

Fig. 11 is a diagrammatic view of the control system;

Figs. 12, 13 and 14 are front elevational, plan and side elevational views respectively of aircraft in accordance with this invention.

Referring to the drawings, Figs. 1, 2 and 11.

A helicopter has a pair of side-by-side rotors 100, 200 of similar construction which rotate in opposite directions. These are shown diagrammatically in Fig. 1 which shows them driven through shafts 101, 201, and bevel drives 102, 202 respectively. Below the rotor 100 is mounted a chain wheel 103 which is driven by a short length of chain coupled to control wires 104, 104a passing over pulleys 105, 105a from a wheel 106 of the pitch change control hereinafter described. Below the chain wheel 103 is mounted a smaller chain wheel 107 which is coupled by control wires 108, 108a passing over pulleys 109, 109a to a pilot's control for effecting cyclic pitch change of the rotor hereinafter described with reference to Fig. 11. Similar arrangements are provided for the rotor 200, the parts corresponding to the parts 103 to 109a having reference numbers 203 to 209a. The rotor drive shafts 101, 201 are driven from a gearbox 110 on the centre line of the aircraft.

The gearbox 110 is driven by a shaft 111 from a power unit (not shown) which may either be used to supply power to the rotors continuously during normal flight if the aircraft is to be operated as a helicopter or only for the purpose of starting the rotors when the aircraf is to be operated as a gyroplane, i. e. with autorotation of the rotors.

While no mention of an airscrew drive has been made in the foregoing description it is to be understood that one or more airscrews for forward propulsion may be provided and be driven in a suitable manner from the power unit or from one or more other power units mounted within the fuselage or in engine nacelles carried by stub wings on either side of the fuselage. Since the disposition and arrangement of such propulsive airscrew is not a part of the present invention it is thought unnecessary to describe it in greater detail. Alternatively a propulsive force may be obtained by simultaneous tilting of the lift lines of the pair of rotors so that the rotors in addition to providing a lift force component also provide a horizontal component. By suitable inclination of the lift lines the direction of this horizontal component can be arranged to give motion in any direction.

The rotor pitch control unit is illustrated in Figs. 3 and 4. It comprises a housing 150 having at one end a cylinder 151 in which a piston 152 with piston rings 153 is slidable. The cylinder head 154 secured to the housing 150 by studs and nuts 155 has a central passage 156 which communicates through a union 157 and a screwed pipe joint 158, 159 with a pipe 160 which leads to a pilot's or automatic rotor pitch control valve and thence to a source of fluid pressure such as a pump mounted on a power unit.

The piston 152 is connected, by a thrust ball bearing 161 (housed in a recess 162 in the piston), to a sleeve 163. The sleeve 163, and thus the piston, is urged by a coil spring 164 into the cylinder 151, the left hand end (as seen in Fig. 4) of the spring 164 abutting against an annulus 165 screwed onto the left hand end of the sleeve 163. Axially slidable within the sleeve 163 and splined thereto is a liner 166 which surrounds the spring 164 and carries at its right hand end a sprocket 167 clamped to the liner 166 by a screwed ring 168 which also secures a ball journal bearing 169 against a collar 170 on the liner. The outer member of the ball bearing 169 is held in a recess 171 in a cover plate 172 clamped to the housing 150 by studs and nuts 173. The aperture in the cover plate 172 through which passes the liner 166 is a close fit over the liner and is provided with a dirt excluding packing 174.

Formed on the exterior of the sleeve 163 are coarse pitch left and right hand screw threads 175 and 176 which are similar to each other except in hand. These threads 175 and 176 are engaged respectively by projecting parts 177 and 178 on rack members 179 and 180 which are of generally cylindrical shape and slide in guides 181 and 182 in the housing 150 and have rack surfaces 183 and 184 which engage pinions 185 and 186 on shafts 187 and 188 respectively. The shaft 187 is mounted in journal ball bearings 189 and 190 housed in recesses 191 and 192 in the housing 150 and is held in position by a ring 193 and oil retaining packing 194. A flange 195 on the shaft 187 has a chain wheel 206 secured to it by bolts 196. The mounting of the shaft 188 is similar to that of the shaft 187 and it carries a chain wheel 106.

A rod 220 is attached to a projection 224 formed on the piston 152 by a ball joint comprising a ball 221 on the rod, a seating 222 and a screw cap 223. The cap 223 is maintained against rotation by a split pin 225. The other end of the rod 220 is pivotally secured to the longer arm of a bell crank 226 pivoted at 227 to a bracket 228 mounted on the housing 150. The length of said longer arm of the bell crank 226 is adjustable by turning a central part 229 having left and right hand threads 230 and 231, relatively to the ends 226 and 232 of said arm. Screwed nuts 233 are provided for locking this central part 229 in the desired adjustment position. The shorter arm of the bell crank 226 is connected by a Bowden wire or analogous transmission 234 to a rotor pitch indicator in the pilot's cockpit.

When oil pressure is applied by the governor unit to the cylinder 151 (through pipe 160) it causes the piston 152 to move to the right (Fig. 4) against the action of the spring 164. As it moves, the piston carries with it the sleeve 163 which slides over the liner 166. The sleeve 163 being secured to the rack members 179 and 180 by the projections 177 and 178 carries these rack members with it, causing rotation of the pinions 185, 186 in opposite directions, thereby rotating the chain wheel 206 counter-clockwise and the chain wheel 106 clockwise. These chain wheels are coupled to the rotor hubs to give equal increase of the pitch of each rotor. When the oil pressure is reduced the piston 152 urged by the spring 164 moves back towards the left and causes equal reduction of pitch of the rotors.

Referring to Figures 1, 3, 4 and 11, rotation of the sprocket 167 causes turning of the liner 166 and the sleeve 163 splined thereto relatively to the housing 150 and piston 152. This turning brings into play the opposite handed threads 175 and 176 and hence movement of the rack members 179 and 180 in opposite directions giving equal and opposite or differential pitch change of the two rotors. This differential pitch change of the rotors is arranged to provide lateral (rolling) control of the aircraft. The sprocket 167 is coupled to a pilot's control column 115 so that when the column is moved sideways the rotor pitches are altered differentially.

The construction of a rotor hub is illustrated in Figs. 5 to 10. Each rotor blade 250 is secured at its root end to a root member 251 supported by journal ball bearings 252 and 253 and a ball thrust bearing 254 in a hollow sleeve split into two parts 255 and 256 secured together by bolts and nuts 257 (see Figures 5a and 7a). Each of the parts 255, 256 forming the sleeve has a lug 258 with an aperture 259 forming a housing for the roller bearing 260 of a flapping articulation (see Fig. 8). Each of the bearings 260 is held in position by a ring 261 with a locking screw 262. The pin members 263 of the flapping articulation are two opposite branches of a spider 264 having four branches in one plane mutually at right angles to each other. The branches 265, 270 form the inner members of a vertical drag articulation the axis of which intersects the axis of the flapping articulation at right angles. Plugs 266 are screwed into the ends of the pin members 263 which are hollow.

The drag articulation is best seen in Fig. 5a. The spider 264 has a pair of vertical pin members 265, 270 which form the inner parts of combined journal and thrust conical roller bearings 271 and 272. The outer part of the upper bearing 271 is held in a recess 273 in a lug 274 extending from the rotating shell 275 of the hub, while the outer part of the lower bearing 272 is similarly held in a recess 276 in a member 277 surrounding the shell 275 and secured thereto by bolts 278 which pass through holes in lugs 279 and 280 on the shell 275 and member 277 respectively.

A screwed plug 281 at the upper end of the upper pin member 265 rigidly secures thereto a plate 282 at each end of which links 283 are pivotally secured (see Fig. 7a). The other ends of these links 283 are pivotally secured to lugs 284 on plates 285, one for each blade, arranged in pile form concentrically above the hub (see Fig. 5). Between adjacent plates 285 are arranged rings of friction material 286. The whole assembly forms a friction damper for movements about the drag articulations and is rotatable as a unit relatively to the shell 275 of the hub, together with a cover plate 340 of the hub. As seen in Figures 5a and 8, a screw plug 287 at the lower end of the lower pin members 270 holds in position a plate 288 which has a central aperture with a series of inwardly directed serrations 289. These serrations engage corresponding outwardly directed teeth 290 on the pin member 270 and allow the plate 288 and pin member 270 to be secured together in various rotational positions. The plug 287 is secured to the plate 288 by a set screw 291. The plate 288 has on its periphery stops 292 which cooperate with stops 293 on the housing 276 to limit movement of the blade about the drag articulation (see Fig. 8). By removing the plate 288 and re-engaging it in a different rotational position on the pin member 270 these limits can be altered.

The root member 251 of the blade has an inwardly directed extension 300 which terminates with a pair of arms which engage a circumferential groove 301 in a ball 302 the centre of which lies at the intersection of the flapping and drag axes. A similar groove 303 at right angles to the groove 301 is engaged by the forked arms 304 at one end of a shaft 305 which is supported in journal ball bearings 306 carried by a sleeve 307 which passes through the shell 275 and is screwed into a lug 308 thereon. Keyed to the inner end of the shaft 305 is a pitch change arm 309 which is secured in position by a bolt and nut 310 which clamp the split end of the arm 309 onto the shaft 305 and by a nut 311 on the shaft 305.

At its free end the pitch change arm 309 has a pin 312 which extends generally radially outwards and carries a spherical seating member 313 held in position by a bolt 316 and cooperating with an internal partly spherical surface 314 in an aperture at the upper end of a dependant pitch change link 315. At its lower end the pitch change link 315 has a similar surface 317 cooperating with a spherical seating member 318 held in position by a bolt 319 on a radial pin 320 carried by a swash plate 325.

The swash plate 325 is carried by bearings 326 and 327 on a spindle 328 which is tiltable in a vertical fore-and-aft plane about the axis of a pivot 329. The lower bearing 327 acts as a thrust and journal bearing while the upper, 326, separated from the former by a distance piece 330, is a journal bearing only and is secured by a nut 331 on the spindle 328. Secured by bolts 332 to the upper end 325a of the swash plate 325 is a lower element 333 of an universal joint 334 the other element 335 of which is secured to one part 336 of a link 336, 337 comprising two telescoping parts having splines 338 between them. The part 337 of the link is attached by an universal joint 339 to a flange of a cover plate 340 of the hub.

The cover plate 340 is bolted at 345 to an annular member 346 which supports the friction damper hereinbefore described and which is carried by journal bearings 347, 348 spaced by a distance piece 349 and secured by a nut 350 on an upwardly extending flange 351 of a bridge plate 352 secured to the upper end of the shell 275 of the hub by bolts 353.

It will be seen that the above-described connection between the swash plate 325 and the cover plate 340 ensures that they turn simultaneously while permitting vertical movement between them. Thus when the annular member 346 carrying the friction damper for lead-lag movements of the blades moves relatively to the shell 275 it turns the swash plate and prevents any pitch angle change due to such movement.

The spindle 328 has formed integrally with it a bell crank having two parallel arms 360 spaced apart and also a transverse bush 361 through which passes the pivot 329 carrying at each end a journal ball bearing 362 secured in position by a nut 363. The outer parts of the bearings 362 are supported by bushes 364 in flanges 365 extending upwardly from a crosshead 366 which is vertically slidable relatively to a fixed part 367 of the hub and is maintained against rotation by a keyway 359. The crosshead 366 has an internal flange 368 to which a flange 369 of a member 370 having coarse pitch internal and external screw threads, is secured by bolts 371.

The external thread on the member 370 is engaged by an internally screw threaded ring 372 supported by thrust bearings 373, which prevent vertical movement, in the fixed part 367 of the hub. The thrust bearings 373 have between them an oil retaining packing ring 374 and are held in position by a clamping ring 375. Bolted at 376 to the lower end of the ring 372 is a chain wheel 103 by which, as previously mentioned, the pitch of the rotor is controllable.

When the chain wheel 103 is turned it turns the ring 372, the screw-thread on which causes the member 370 and crosshead 366 to move vertically carrying with it the pivot 329, spindle 328 and swash plate 325. Since the lower ends of the pitch change links 315 are secured to the swash plate 325 they transmit the vertical movement to the pitch change arms 309 secured to the blades thereby causing the shafts 305, ball 302 and blade root 251 to turn, altering the pitch angles of the blades.

Between the open ends of the arms 360 of the bell crank integral with the spindle 328 is a bolt 380 locked in position by a set screw 381. Carried by the bolt 380 is the inner element of a needle roller bearing 382 the housing of which is formed by an apertured lug 383 of a connecting link 384. A second needle roller bearing 385 is similarly mounted in an apertured lug 386 at the other end of the connecting link 384. The inner element of the bearing 385 is carried on a bolt 387 secured by a nut 388 and extending between flanges 389 at the upper end of a central member 390. The latter is secured to a sleeve 391 by combined journal and thrust bearings 392 which allow relative rotation but no axial movement between the central member 390 and sleeve 391. The bearings 392 are secured to the central member by a ring 393 and distance piece 394 and are similarly secured by a ring 395 and distance piece 396 to the sleeve 391.

The sleeve 391 has a flanged part 397 with an external screw thread cooperating with the internal screw thread on the member 370. On the exterior of the generally cylindrical part of the sleeve 391 are formed projections 398 which engage keyways 399 in the elongated bush 400 of a chain wheel 107. These keyways 399 permit the sleeve 391 to move vertically relatively to the hub but transmit to it rotational movements of the chain wheel 107. The bush 400 is supported by combined journal and thrust bearings 401 which are secured on the bush by a ring 402 and distance piece 403 and on the bush 404 of the chain wheel 103 by a ring 405 and distance piece 406.

When the chain wheel 107 is rotated it turns the sleeve 391 which moves vertically under the action of the screw threads on its flanged part 397 carrying with it the central member 390 and the lower end of the arms 360 of the bell crank which tilts the spindle 328 integral therewith. This tilts the swash plate 325 so that as it rotates with the rotor the lower ends of the pitch change links 315 move vertically up and down causing cyclic pitch change.

The rotors are driven from the common gear box 110 by shafts 101 and 201. As seen in Figure 5a, the end of the shaft 101 nearest the rotor 100 has a flange, not shown, which is bolted to a flange 500 secured on a shaft 501 by keys 502 and a ring 503 screwed onto the shaft. The shaft 501 is carried in ball bearings 504 and a roller bearing 505 within a sleeve 506 slidable within a cylindrical projection from the main non-rotating part 367 of the hub. This sleeve provides means for locating the shaft in correct axial position so that a pinion 507 on the shaft 501 meshes properly with the crown wheel ring 102 of the rotor. This axial adjustment is provided by shims 508 interposed between a flange 509 on the sleeve 506 and a ring 510 clamped by studs and nuts 511 to the hub part 367. The ring 510 clamps the bearings 504, 505 and a distance piece 512 within the sleeve 506 and also provides a housing for an oil-retaining packing 513. On the shaft 501 the bearings and a distance piece 514 are secured by the clamping action of the ring 503.

The crown wheel ring 102 is bolted at 515 to an annulus 516 supported within the non-rotating part 367 of the hub by combined journal and thrust bearings 517, 518 supported by parts 519 and 520 respectively which latter are secured by studs and nuts 521 and 522 to the hub part 367.

An oil-retaining packing 523 is held by a ring 524 carried by the part 520.

Reference should now be made to Figure 9, in conjunction with Figure 5. An axially slidable member 525 is attached by splines 526 to the inner surface of the annulus 516 and is urged upwardly by springs 527 surrounding rods 528 carried by a lower spacer 529 and by holes 530 in the member 525. The upper end of the member 525 has a series of dog clutch surfaces 531 spaced at 120° (the same angle as that between the rotor blades) and backed off by inclined surfaces 532. These clutch surfaces 531 are adapted to engage corresponding surfaces 533 projecting downwardly from an upper clutch member 534, which also has inclined surfaces 535 corresponding to the inclined surfaces 532. The upper clutch member 534 is secured by the bolts 278 to the shell 275 and is supported near its upper end by a journal and thrust bearing 536 supported by the part 519 on the stationary part of the hub. While the rotor is being driven the surfaces 531 and 533 are pressed together but when the rotor is overrunning the drive, the member 525 is pressed downwardly against the action of the springs 527 by the inclined surfaces 532 and 535.

The lower end of the shell 275 is supported by a thrust and journal bearing 550 between said shell and the annulus 516. Secured to the lower end of the shell 275 is a rotor brake drum 551 held in position by a ring 552. The brake (see especially Fig. 10) has two shoes 553 with surfaces of friction material 554 attached by rivets 555. One end of each of the shoes 553 is pivotally connected at 556 to the stationary hub part 367, the pivot pin 556 being secured by a screw nut 557. The other ends of the brake shoes are pressed by a spring 561 into contact with control plungers 558 which move in a common cylinder 559 into the central part of which oil under pressure is introduced through a passage 560 when it is desired to stop the rotor.

Fig. 11 shows diagrammatically the rotor control system adapted for dual control, the pilots being seated in tandem. Two control columns 115, 115a are mounted on ball points 700, 700a so as to be movable in any direction. The column 115 is coupled to the column 115a by a shaft 701 having an universal joint (not shown) at each end so that lateral movements of the columns are coordinated. The shaft 701 is suitably journalled and carries a chain wheel 702 coupled by a loop of chain 703, 703a to the sprocket 167 of the pitch control unit 150.

The arrangement is such that lateral movements of the control columns give equal and opposite or differential pitch change of the two rotors. When the control columns are moved to the right the starboard rotor pitch is reduced while that of the port rotor is increased.

The control columns 115 and 115a are coupled together for equal fore and aft movement by a link 710 pivotally secured at its ends to the control columns. As illustrated the link 710 is arranged above the ball mounting 700 but if desired it could be arranged below. Reference has already been made to the cables 108, 108a and 208, 208a which have chain insertions which engage the cyclic pitch change wheels 107, 207 of the rotors 100 and 200 respectively. The cable 108 passes over a pulley 711 then downward over a pulley 712 and rearwardly to attachment to the lower end 715 of the control column 115. Similarly the cable 208 passes over pulleys 713 and 714 and is secured to the same point 715.

The cable 108a runs inwardly to a pulley 716, downwardly to a pulley 717 and forwardly to the lower end 718 of the other control column 115a. The cable 208a similarly passes over pulleys 719, 720 to the point 718. This arrangement provides for simultaneous equal cyclic pitch change of the two rotors when the control columns are moved forwardly or rearwardly, giving pitching control of the aircraft.

The pulleys 714, 720 and 712, 717 are each mounted on shackles pivotally secured to the two ends of an arm 721 which is capable of swinging in a horizontal plane about its midpoint 722. The arm is connected by crossed cables 723, 723a to the forward rudder bar 724a which can pivot in a horizontal plane about its midpoint 725a. The other rudder bar 724 similarly mounted to turn about its midpoint 725 is coupled by cables 726, 726a to turn with the rudder bar 724a.

When the right hand ends of the rudder bars are moved forward, the left hand end of the arm 721 is moved forwardly carrying with it the pulleys 712 and 717. This tends to put the cable 108 in tension while slackening the cable 108a thereby rotating the chain wheel 107. At the same time the chain wheel 207 of the other rotor is turned in the opposite sense thus causing differential cyclic pitch change of the rotors i. e. an inclination in opposite generally fore and aft directions of the lift lines of the two rotors, resulting in yawing of the aircraft. It will be seen that this yawing control is available in addition to the pitching control due to simultaneous equal inclination of the lift lines of the rotors.

Referring to Figs. 12 to 14. An aircraft has a fuselage 50 with a pair of outriggers 51 each carrying a sustaining rotor 52 with blades 53. The rotor hub is surrounded by a fairing 54. The aircraft has a pair of landing wheels 55. A rudder 56 and a tailplane 57 are mounted at the aft end of the fuselage and are disposed outside the slipstream of the rotors. Each of the outriggers 51, as will be seen from the drawings, is attached to the lower part of the fuselage 50 and extends upwardly to the fairing 54 and is also backswept. I have found that this configuration results in a decrease in the interference of the outrigger with the slipstream of the rotor when it is power driven and that the aerofoil shape of the outriggers gives a useful addition to the lift during forward flight.

When the aircraft is in hovering flight the lift vectors of the two rotors may be assumed to pass through the centre of gravity of the aircraft. To promote forward speed, it is necessary to incline the real or mechanical axes of the rotors so as to obtain the necessary forward components of thrust. In still air, no resource can be obtained from normal fin surfaces, such as an elevator, but a movement of the control column may be used to produce a cyclic pitch change so that the virtual axes will be inclined to the real axes and the resulting lift-vectors will pass behind the centre of gravity of the machine and cause the tail or rear end of the machine to rise and thus incline the real axes in a forward sense. The machine will now commence forward motion and, as differential velocity of the airstream will be experienced by the rotors, flapping will take place, tending to oppose the inclination of the real axis. But the attitude of the machine in relation to the position of the control column maintains a cyclic variation of pitch which causes a cyclic reduction of the geometric pitch of the advancing blades, and a cyclic increase of pitch of the retarding blades, thus maintaining equal lift over the discs and reducing flapping. The effect is produced automatically by the pilot in maintaining the required flight path, it being within his capacity correctly to trim the craft accordingly, but such trim may be automatically operated by any known means.

During the application of control to produce cyclic variation of pitch to incline the real axes a certain amount of roughness will be experienced, but as the rate of inclination is relatively small and, in the case of rotors of three blades or more, of small magnitude of asymmetry, the vibrations are negligible and may be suppressed by a return of the control column to normal after the inclination of the real axes, and slowly advanced as the forward speed increases, so as to maintain the selected flight path and speed. The same effect is obtained when the craft is flown backwards, and such inclination of the virtual axes provides the necessary control about the pitching axis.

Owing to the roughness or asymmetry associated with the inclination of the virtual axes, the lateral control or control about the rolling axis is obtained by a variation of the lift moments of the two rotors, either singularly or simultaneously and differentially by increasing or decreasing the incidence of one set of blades, or differentially increasing the incidence of one set of blades with decrease of incidence of the other set of blades. Rolling control is thus obtained by an increase or decrease of the lift moments by alteration of the angles of all the blades. This alteration does not produce any roughness and, as there is no real lateral thrust component, it is not necessary to compensate for flapping by a cyclic pitch change. The rotors operate smoothly.

Yawing control may be obtained by a normal rudder in forward flight, or in hovering flight by a suitable surface situated in the rotor race or races (slip stream); or as provided by the mechanism, and in combination with the other components, the virtual axes of the rotors may be inclined differentially in a fore and aft direction to give the necessary thrust components to produce a turning moment about the yawing axis as herein described.

There having been described the mechanism whereby the flapping is eliminated and control obtained, there remains to be considered the variable lift or sheer forces experienced by the root ends of the blades, and thus communicated to the craft in the form of vibrations.

It has been explained that the longitudinal position of the centre of pressure moves along the blades under the effect of an increase or decrease of speed of the fluid flow, and although the lift of the advancing and retreating blades remains substantially constant due to the cyclic variation of pitch, the excursion of the centre of pressure on either side of the centre of inertia of the blades (a point along the blades representing the concentration of the dynamic forces) causes a differential bending in the blades, resulting in a variable sheer or lift at their root ends.

It is known that blades that are flexible in the vertical sense considerably reduce this effect, but it is proposed to use such blades in conjunction with the components in the two rotor hubs, and, in the case of two rotors of three blades, the rotors are timed by means of the driving gears to rotate in out-of-phase relation and so produce a slight oscillation about the longitudinal axis of the craft; such oscillation, being the product of the variable sheer forces of the rotor blades, will be unnoticed by the pilot and passengers, who are arranged to sit along or close to the longitudinal axis of the machine. Direct vertical vibrations, however, are unpleasant to the occupant. Further, the flexibility present in the members carrying the rotors absorbs such oscillations and the members may be so constructed to damp out any tendency to resonance as from rotor to rotor. Important components in the rotor hubs are free-wheels which are of ratchet form with teeth cut at (for three-bladed rotors) 120° so that the out of phase relation of the rotors is maintained at all times when the rotors are being power driven.

It has been proposed to attach rotor blades to a rocking beam or member by means of a hinge permitting vertical freedom of the blades, but it should be noted that the present invention provides for the blades to be attached by universal joints. Coaxially mounted inside the said universal joints are additional universal joints adapted to transmit pitch angle changing movements to the blades. This arrangement permits of unrestricted pitch angle changing movement of the blades irrespective of their deflected position in the vertical or horizontal planes, and at the same time keeps the control in correct phase.

The disposition of the drag articulation so that its axis intersects the axis of the flapping articulation also ensures that movement of the blade about the latter articulation, does not affect movement about the drag articulation. This arrangement, apart from other advantages, permits the provision of a common friction damper centrally arranged and connected to the blades by links to allow of free oscillation of the axle in relation to the blades, but frictionally damps any inter-blade displacement.

It is to be noted that the off-set of the flapping hinges (outer members of the universal joints) gives inherent stability to the rotor and slows down the rate of pitch or roll on account of the reluctance of the rotor to follow any inclination of the real or mechanical axis under the influence of the restoring force due to the centrifugal force, or as it may be termed a "meta centre effect."

What I claim is:

1. In an aircraft, a sustaining rotor comprising a hub and a blade mounted thereon with freedom for pitch change movement and with freedom for lag-lead movement, mechanism for effecting pitch variation of said blade including a pitch control member mounted with freedom for lag-lead movement with respect to the hub and being movable in another sense to effect cyclic pitch variation, and means of connection between the blade and said member providing for conjoint movement of said control member and said blade in the lag-lead sense.

2. For an aircraft sustaining rotor, a rotor hub and blade mounting structure including a rotative hub member, pivot mechanism for connecting each blade with the hub member comprising flapping, drag and pitch change pivots, the flapping and drag pivot axes intersecting each other and the pitch change pivot being located outboard of the flapping and drag pivots with its axis intersecting the axes of the flapping and drag pivots at the point of intersection thereof, the blade being mounted for movement as a whole about the axis of the pitch change pivot, and controllable means for varying the position of the blade on its pitch change pivot including a control connection universally jointed concentrically with the point of intersection of the flapping and drag pivots.

3. In an aircraft sustaining rotor, a rotative hub member to which the blades of the rotor are connected, for each blade mounting mechanism incorporating a drag pivot and a pitch change pivot through which the blade is connected to the hub, controllable pitch varying mechanism including a tiltable rotative swash member, means for tilting the swash member, actuating linkage between the swash member and the respective blades for imposing periodic cyclic pitch variation on each blade in accordance with the tilt of the swash member, and means interconnecting the blades and said swash member and providing for angular movement of the swash member with simultaneous angular lag-lead movements of the blades about the drag pivot axes therefor.

4. A construction in accordance with claim 3, in which the means interconnecting the blades and the swash member includes a multi-disc friction damper device journaled for free rotation as a unit substantially about the axis of the rotor hub, a torque connection between said device and said swash member, and connections between the blades and separately movable discs of said device, the several discs being in frictional interengagement whereby to resist asymmetrical lag-lead movements of the blades and whereby to cause said device to rotate as a unit upon simultaneous lag-lead movements of the blades.

5. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, and means for turning the shaft to impart change of pitch angle to the blades.

6. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a member common to all the blades movable axially of the hub, a link connecting each arm to said axially movable member and means for moving the latter to impart change of pitch angle to the blades.

7. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a member common to all the blades movable axially of the hub, a link connecting each arm to said axially movable member, a non-rotative axially movable part rotatably supporting said axially movable member common to all the blades and means for moving the non-rotative part axially of the hub to impart change of pitch angle to the blades.

8. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a member common to all the blades movable axially of the hub, a link connecting each arm to said axially movable member, a non-rotative axially movable part rotatably supporting said axially movable member common to all the blades and having a screw thread, a screw threaded member engaging said screw thread, a chain wheel mounted on said screw threaded member, and means for rotating the chain wheel to impart change of pitch angle to the blades.

9. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a swash plate, a link connecting each arm to the swash plate, means for moving the latter axially of the hub to effect change of the mean pitch angle of the blades and means for tilting the swash plate to impart cyclic change of pitch angle to the blades.

10. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a swash plate, a link connecting each arm to the swash plate, a non-rotative axially movable part, a spindle supporting the swash plate and forming one arm of a bell crank pivotally attached to the non-rotative axially movable part, means for moving the latter axially of the hub to effect change of the mean pitch angle of the blades and means for moving the bell crank about its pivot to tilt the swash plate to impart cyclic change of pitch angle to the blades.

11. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a swash plate, a link connecting each arm to the swash plate, a non-rotative axially movable part, a spindle supporting the swash plate and forming one arm of a bell crank pivotally attached to the non-rotative axially movable part, a screw thread on the latter, a screw thread member engaging said screw thread, a chain wheel mounted on said screw threaded member, an axially movable sleeve, a link rotatably attached to said sleeve and coupling it to the other arm of the bell crank, a second chain wheel having a shank coupled by splines to said axially movable sleeve, and a screw thread on the latter engaging a second screw thread on the non-rotative axially movable part.

12. A hub for an aircraft sustaining bladed rotor comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having two circumferential slots, a fork on the root member engaging one of said slots, a shaft having a forked end engaging the other slot, an arm secured to the shaft, a swash plate, a link connecting each arm to the swash plate, a non-rotative axially movable part, a spindle supporting the swash plate and forming one arm of a bell crank pivotally attached to the non-rotative axially movable part, a screw thread on the latter, a screw threaded member engaging said screw thread, a chain wheel mounted on said screw threaded member, an axially movable sleeve, a link rotatably attached to said sleeve and coupling it to the other arm of the bell crank, a second chain wheel having a shank coupled by splines to said axially movable sleeve, a screw thread on the latter engaging a second screw thread on the non-rotative axially movable part, a driving member, and a dog clutch between the driving member and the rotative hub part having the same number of driving faces as the number of blade root members.

13. A hub for an aircraft sustaining bladed rotor, comprising a root member for each blade, a rotative hub part, flapping and drag articulations between each root member and the rotative hub part intersecting at a point offset from the axis of rotation of the hub, a ball member concentric with the intersection of the axes of the flapping and drag articulations and having circumferential slots, a fork on the root member engaging one of said slots, a shaft having a forked end engaging the other slot, an arm secured to the shaft, a swash plate, a link connecting each arm to the swash plate, a non-rotative axially movable part, a spindle supporting the swash plate and forming one arm of a bell crank pivotally attached to the non-rotative axially movable part, a screw thread on the latter, a screw threaded member engaging said screw thread, a chain wheel mounted on said screw threaded member, an axially movable sleeve, a link rotatably attached to said sleeve and coupling it to the other arm of the bell crank, a second chain wheel having a shank coupled by splines to said axially movable sleeve, a screw thread on the latter engaging a second screw thread on the non-rotative axially movable part, a driving member, a dog clutch between the driving member and the rotative hub part having the same number of driving faces as the number of blade root members, a brake drum mounted on the rotative hub part, brake shoes carried by a non-rotative hub part and means for pressing the brake shoes onto the drum.

14. A sustaining rotor system for an aircraft comprising a pair of bladed rotors having hubs including a root member for each blade, a rotative hub part, flapping and drag articulations between each root member and the rotative hub part intersecting at a point offset from the axis of rotation of the hub, a ball member concentric with the intersection of the axes of the flapping and drag articulations and having circumferential slots, a fork on the root member engaging one of said slots, a shaft having a forked end engaging the other slot, an arm secured to the shaft, a member common to all the blades movable axially of the hub, a link connecting each arm to said axially movable member, a pitch change unit common to both rotors and means for operatively coupling said pitch change unit to each of the axially movable members.

15. A sustaining rotor system for an aircraft comprising a pair of bladed rotors each having hubs including a root member for each blade, an arm coupled to each root member, a swash plate common to the blades of each rotor and links connecting said swash plate to each of the arms, the swash plate being movable axially of the hub to impart change of mean pitch angle to the blades and tiltable to produce cyclic pitch change of the blades thereby causing shifting of the lift line of the rotor, said system further comprising a pilot's control column, an operative connection between the latter and the swash plates of the rotor hubs to produce pitch change of the rotors in opposite senses when the control column is moved sideways and to produce shifting of the lift lines of the rotors in similar generally fore and aft directions when the control column is moved rearwardly and forwardly, and a pilot's yawing control operatively connected to the swash plates to produce shifting of the lift lines of the rotors in opposed generally fore and aft directions.

16. A sustaining rotor system for an aircraft comprising a pair of bladed rotors each having hubs including a root member for each blade, a rotative hub part, flapping and drag articulations between each root member and the rotative hub part intersecting at a point offset from the axes of rotation of the hub, a ball member concentric with the intersection of the axes of the flapping and drag articulations and having two circumferential slots, a fork on the root member engaging one of said slots, a shaft having a forked end engaging the other slot, an arm secured to each shaft, a swash plate common to the blades of each rotor, and links connecting said swash plate to each of the arms, the swash plate being movable axially of the hub to impart change of mean pitch angle to the blades and tiltable to produce cyclic pitch change of the blades thereby causing shifting of the lift line of the rotor, said system further comprising a pilot's control column, an operative connection between the latter and the swash plates of the rotor hubs to produce pitch change of the rotors in opposite senses when the control column is moved sideways and to produce shifting of the lift lines of the rotors in similar generally fore and aft directions when the control column is moved rearwardly and forwardly, and a pilot's yawing control operatively connected to the swash plates to produce shifting of the lift lines of the rotors in opposed generally fore and aft directions.

17. For an aircraft having a pair of side-by-side multi-bladed sustaining rotors, mechanism for driving the rotors including for each rotor an overrunning clutch, each overrunning clutch incorporating a pair of cooperating toothed parts one of which rotates with the driving mechanism and the other of which rotates with the rotor providing a plurality of angularly spaced positions of driving interengagement the number of which is equal to the number of blades in the rotor, and the toothed parts of the two overrunning clutches which rotate with the rotors being relatively angularly oriented to provide a predetermined phase relationship between the rotors when said rotors are being driven by the drive mechanism.

18. For an aircraft having a pair of side-by-side multi-bladed sustaining rotors, mechanism for driving the rotors including for each rotor an overrunning clutch, each overrunning clutch incorporating a pair of cooperating parts adapted to interengage in a predetermined relative position, one of said parts being connected with the rotor for rotation therewith and the other with the driving mechanism, the parts of the two overrunning clutches which rotate with the rotors being relatively angularly oriented to provide a predetermined phase relationship between the rotors when said rotors are being driven by the drive mechanism.

CYRIL GEORGE PULLIN.